United States Patent [19]
Hirayama et al.

[11] Patent No.: US 6,219,672 B1
[45] Date of Patent: Apr. 17, 2001

[54] DISTRIBUTED SHARED MEMORY SYSTEM AND METHOD OF CONTROLLING DISTRIBUTED SHARED MEMORY

[75] Inventors: Hideaki Hirayama, Kawasaki; Kuninori Tanaka; Tetsuya Iinuma, both of Tokyo, all of (JP)

[73] Assignee: Kabushiki Kaisha Toshiba, Kawasaki (JP)

[*] Notice: Subject to any disclaimer, the term of this patent is extended or adjusted under 35 U.S.C. 154(b) by 0 days.

[21] Appl. No.: 09/206,155

[22] Filed: Dec. 7, 1998

[30] Foreign Application Priority Data

Dec. 11, 1997 (JP) .................................................. 9-341384
Apr. 14, 1998 (JP) ................................................ 10-102838

[51] Int. Cl.[7] .................................................. G06F 17/30
[52] U.S. Cl. ..................... 707/102; 707/100; 709/213; 711/147; 711/148; 711/153
[58] Field of Search ............................ 707/102, 100; 709/213, 214, 215, 212; 711/147, 148, 153

[56] References Cited

U.S. PATENT DOCUMENTS 4,228,496 * 10/1980 Katzman et al. ................... 710/128
5,231,593 * 7/1993 Notees ................................. 702/180
5,737,763 * 4/1998 Hilditch .............................. 711/162
5,918,229 * 6/1999 Davis et al. .......................... 707/10

OTHER PUBLICATIONS

R. Agrawal et al., "Mining Association Rules between Sets of Items in Large Databases", Proceedings of ACM SIGMOD, May 1993.
R. Agrawal et al., "Fast Algorithms for Mining Association Rules", Proceedings of 20th VLDB, 1994.

* cited by examiner

Primary Examiner—Thomas Black
Assistant Examiner—Frantz Coby
(74) Attorney, Agent, or Firm—Finnegan, Henderson, Farabow, Garrett & Dunner, L.L.P.

(57) ABSTRACT

When the item appearance frequency count up section counts up the appearance frequency of an item in a shared memory space on the basis of transaction data, a count up log transfer section receives the count up log recorded by a count up log recording section and transfers it to other nodes. A count up log receiving section transfers the count up log transferred from each of the remaining nodes to a count up log reflecting section. The count up log reflecting section, which has received this count up log, reflects its contents in the appearance frequency of the corresponding item in the shared memory space.

20 Claims, 10 Drawing Sheets

```
0X0 0 0 0 4 0 2 0
0X0 0 0 0 4 0 8 4
0X0 0 0 0 6 2 0 4
```
FIG. 7
```
a [3], b [1], c [2]
a [1], b [1], b [2], e [1], x [1]
a [5], c [2], e [1], f [1]
d [3], f [2], h [1], g [2], x [1]
f [2], x [2]
s [1]
```
FIG. 8
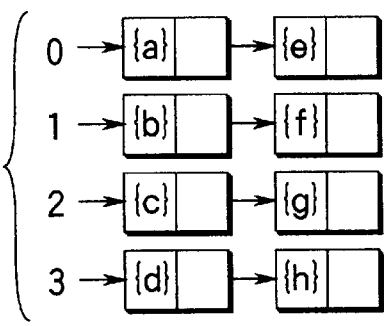
FIG. 9
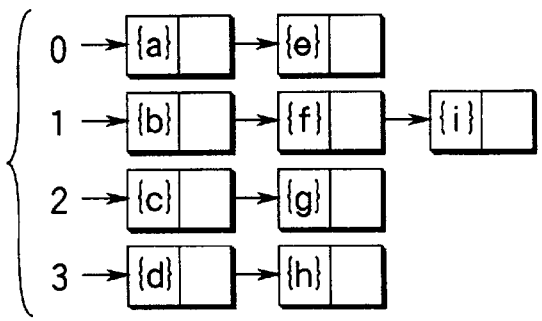
FIG. 10A
FIG. 10B

DISTRIBUTED SHARED MEMORY SYSTEM AND METHOD OF CONTROLLING DISTRIBUTED SHARED MEMORY

BACKGROUND OF THE INVENTION

This application is based on Japanese Patent Application No. 9-341384, filed Dec. 11, 1997, and Japanese Patent Application No. 10-102383, filed Apr. 14, 1998, the contents of which are incorporated herein by reference.

The present invention relates to a distributed shared memory system suitably applied to a multiprocessor system of a shared memory type that executes large-scale data mining, for example, on the TB (terabyte) order, and a method of controlling the distributed shared memory.

With recent advances in bar code techniques and the like, retailers such as supermarkets store a large volume of sales data. Advanced retailers analyze such sales data stored in large volume, and reflect the analysis result in store layouts, thereby increasing sales. Such a technique is generally called data mining.

Of various information obtained by data mining, most typical information is an association rule. For example, an association rule includes the information "50% of the customers who buy packs of paper diaper also buy cans of beer". This is an example associated with supermarkets in the U.S.A. This association rule indicates that in the U.S.A., young fathers often buy packs of paper diaper, and hence buy cans of beer together. In accordance with this information, therefore, for example, packs of paper diaper and cans of beer are placed near to increase the sales of cans of beer. A method of obtaining such an association rule is disclosed in R. Agrawal et al., "Mining Association Rules between Sets of Items in Large Databases", Proceedings of ACM SIGMOD, May 1993. This method will be briefly described below.

Let I={i1, i2, ..., im} be a set (item) of attributes, and D={t1, t2, ..., tn} be a transaction database. In this case, ti is a set of items. An association rule is defined as X≧Y. In this case, X and Y are subsets of I, and the common set of X and Y is an empty set. Two evaluation values referred to as support and confidence values will be defined. A support value indicates the ratio of X to D, and a confidence value indicates the ratio of transactions, which include both X and Y, to the transactions including X in D. An association rule is extracted by the following procedure.

(1) An item set that satisfies the minimum support value is detected (this item is called a frequent item set).

(2) An association rule that satisfies the minimum confidence value is detected from the frequent item set obtained in (1).

An example of how an association rule is extracted will be described below. Assume that T1={1, 3, 4}, T2={1, 2, 3, 5}, T3={2, 4}, T4={1, 2}, and T5={1, 3, 5} are set as transactions. An association rule that satisfies a minimum support value of 60% and a minimum confidence value of 60% is detected from these transactions. A frequent item set is {1}, {2}, {3}, and {1, 3}, and 1≧3 is obtained as an association rule.

Apriori algorithm is known as a technique of efficiently extracting this frequent item set. Apriori algorithm is described in R. Agrawal et al., "Fast Algorithms for Mining Association Rules", Proceedings of 20th VLDB, 1994. This technique will be briefly described below.

(1) A transaction database is read, and the appearance frequency of each item is counted up, thereby obtaining support values. In this case, to count up the appearance frequency of each item is to count the number of times each item appears in the transaction database. Subsequently, "count up" indicates this.

(2) Items that satisfy the minimum support value are extracted as a frequent item set having length 1.

(3) Combinations of pairs of items are formed from the frequent item set having length 1. These combinations will be referred to as candidate item sets having length 2.

(4) Support values are obtained by searching the transaction database.

(5) Items that satisfy the minimum support value are extracted to form a frequent item set having length 2.

(6) The following is the processing to be performed in the case of length k(≧2).

(a) A candidate item set having the length k is formed from a frequent item set having a length k−1.

(b) Support values are obtained by searching the transaction database.

(c) Items that satisfy the minimum support value are extracted to form a frequent item set having the length k.

(7) The above processing is repeated until the frequent item set becomes empty. As described above, in conventional data mining, this Apriori algorithm is basically used to find association rules.

Although this Apriori algorithm is efficient, since transaction data to be processed in data mining is on the TB order, large-volume transaction data cannot be processed. Even if such data can be processed, it takes an enormous processing time. For example, 1-TB transaction data corresponds to 500 2-GB (gigabyte) disk units. Even if an SMP computer is used, it is difficult to connect all the 500 disk units to one computer. Even if 500 disk units can be connected, problems arise in terms of I/O performance. For this reason, disk units storing transaction data on the TB order are preferably distributed to a plurality of nodes to be processed by using a cluster system. However, since Apriori algorithm is an algorithm for sequential processing, this algorithm does not operate on the cluster system. Even if this Apriori algorithm is improved to operate on a cluster system of a distributed memory type, the resultant system inevitably becomes a programming model of a distributed memory type accompanying communications. This makes it difficult to develop a data mining program. More specifically, a programming model of a shared memory type allows exclusive control using a lock mechanism. In the case of a programming model of a distributed memory type, however, since each processor cannot see an identical storage area in each distributed memory, the algorithm must be basically changed, and the program must be modified.

BRIEF SUMMARY OF THE INVENTION

It is an object of the present invention to provide a distributed shared memory system which can efficiently process large-scale data mining, for example, on the TB (terabyte) order.

According to the present invention, there is provided a distributed shared memory system applied to a multiprocessor system of a distributed memory type in which a plurality of computers are loosely-coupled, comprising shared memory space providing means for providing a shared memory space which is commonly accessible with an identical address with respect to all the processes operating on the plurality of computers, data structure preparing means for preparing, in the shared memory space, a data structure storing appearance frequency in units of sets of specific items extracted from input data by the processes, count up history obtaining means for obtaining a history of count up of the process with respect to the appearance frequency stored in the data structure, count up history transfer means for transferring, to other computers, the count up history obtained by the count up history transfer means, count up history receiving means for receiving the count up history transferred from each of other computers, and count up history reflecting means for reflecting the count up history received by the count up history receiving means in the appearance frequency stored in the data structure.

In addition, according to the present invention, there is provided a distributed shared memory control method applied to a multiprocessor system of a distributed memory type in which a plurality of computers are loosely-coupled, comprising the steps of providing a shared memory space which is commonly accessible with an identical address with respect to all the processes operating on the plurality of computers, preparing, in the shared memory space, a data structure storing appearance frequency in units of sets of specific items extracted from input data by the processes, obtaining a history of count up of the process with respect to the appearance frequency stored in the data structure, transferring the obtained count up history to other computers, receiving the count up history transferred from each of other computers, and reflecting the received count up history in the appearance frequency stored in the data structure.

According to the present invention, for example, data mining based on Apriori algorithm is performed parallel in the multiprocessor system of the distributed memory type having no shared memory to process transaction data on the TB order at a high speed.

In addition, with the provision of a virtual distributed shared memory, a programming model of a distributed memory type accompanying communications is not required (each program can be created without any consideration of communications, and hence can be created by using a programming model of a shared memory type) in spite of the use of multiprocessor system of a distributed memory type. This allows development of a program based on a shared memory model as a natural extension from sequential processing. This therefore facilitates development of data mining programs for finding association rules with various modifications.

According to the present invention, for example, transaction data on the TB order can be processed at a high speed by causing the multiprocessor system of the distributed memory type having no shared memory to perform parallel processing for data mining based on Apriori algorithm.

In addition, with the provision of a distributed shared memory, a programming model of a distributed memory type accompanying communications is not required in spite of the use of multiprocessor system of a distributed memory type. This allows development of a program based on a shared memory model as a natural extension from sequential processing. This therefore facilitates development of data mining programs for finding association rules with various modifications.

According to the present invention, since an extension of a data structure constructed in a distributed shared memory can be exclusively controlled among a plurality of computers, the data structure can be extended during count up operation, thus flexibly coping with addition of items as count up targets.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a view showing the structure of a count up log in this embodiment;

FIG. 8 is a view showing the structure of transaction data used when an association rule is obtained by processing quantity data as well in this embodiment;

FIG. 9 is a view showing the structure of a count up log 20 used when an association rule is obtained by processing quantity data as well in this embodiment;

FIGS. 10A and 10B are views showing an extension of a data structure in the distributed shared memory system;

DETAILED DESCRIPTION OF THE INVENTION

The embodiments of the present invention will be described below with reference to the views of the accompanying drawing.

Figure 1A:
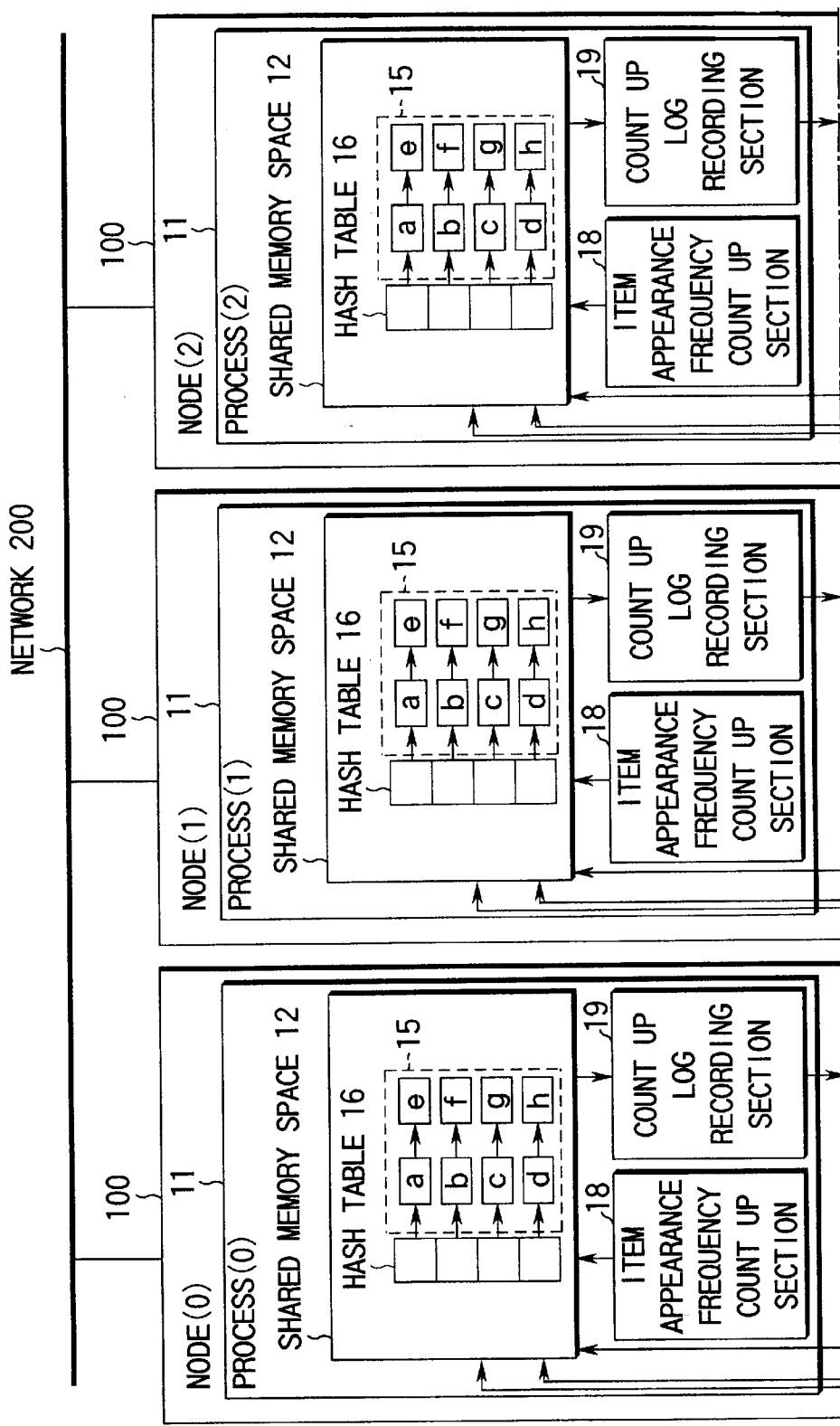
FIGS. 1A and 1B illustrate a block diagram showing the schematic arrangement of a multiprocessor system of a distributed memory type according to an embodiment of the present invention and the functional blocks of a distributed shared memory system applied to the multiprocessor system.
Figure 1B:
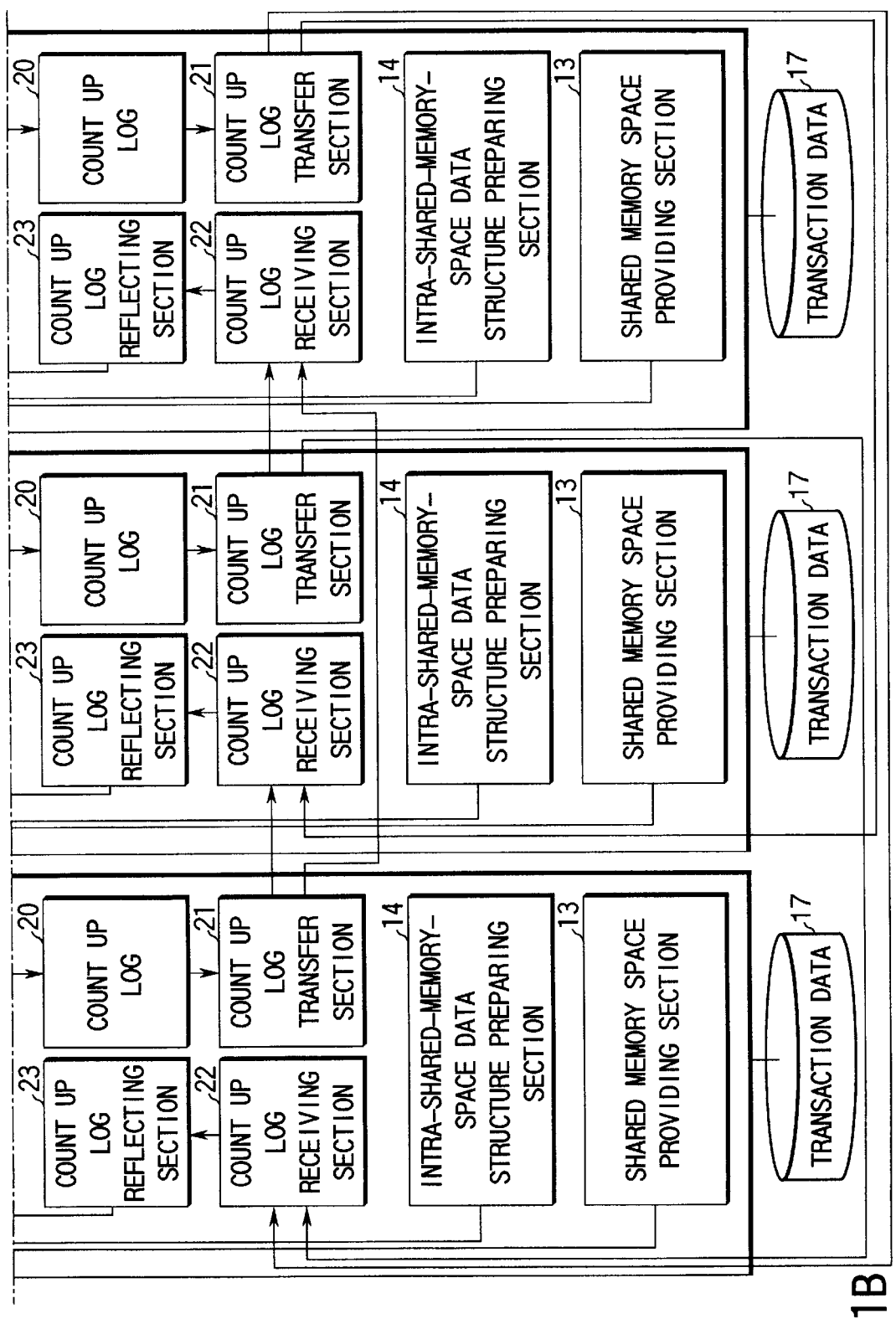

FIGS. 1A and 1B show the schematic arrangement of a multiprocessor system of a distributed memory type according to an embodiment of the present invention and the functional blocks of a distributed shared memory system applied to this multiprocessor system.

Each of nodes 100 includes at least one processor, one memory, and one I/O unit. These nodes 100 are connected to each other through a network 200.

A process 11 operates on each node 100. The address space of each process 11 incorporates a shared memory space 12 that can be seen commonly (at the same address) from all the processes 100. This shared memory space 12 is provided by a shared memory space providing section 13. More specifically, the shared memory space providing section 13 manages information indicating specific memories serving as pseudo shared memory spaces.

In this shared memory space 12, a hash table 16 having a hash structure is prepared by an intra-shared-memory-space data structure preparing section 14. Statistical information 15 including item types and appearance frequencies is stored in this hash table 16. The hash table 16 (to be read before a transaction table is read) is prepared in one of the nodes 100 and copied to the remaining nodes 100. Alternatively, such tables are concurrently prepared in all the nodes 100. Note that "item" indicates, for example, an article such as a paper diaper or can of beer in terms of POS data on a supermarket.

When the process 11 loads transaction data 17, the appearance frequency of the corresponding item in the statistical information 15 is counted up by an item appearance frequency count up section 18 of the process 11. Note that "transaction data" indicates a purchase receipt of a paper diaper, can of beer, or the like in terms of POS data on a supermarket.

Referring to FIGS. 1A and 1B, only one disk unit is present in each node, and all the transaction data 17 is stored in it. In practice, however, many disk units are present in each node 100, and the transaction data 17 is distributed and held in them. For example, 1-TB transaction data demands 500 2-GB disk units. In a system composed of 10 nodes, therefore, 50 disk units are connected to each node. The 1-TB transaction data is distributed and stored in the 500 disk units in the 10 nodes.

When the item appearance frequency count up section 18 of the process 11 counts up the appearance frequency of an item, a count up log recording section 19 of the process 11 records a count up log 20 as a count up history at the same time. This count up log 20 is transferred to the remaining nodes 100 by a count up log transfer section 21.

This transferred count up log 20 is received by a count up log receiving section 22 in each node 100. A count up log reflecting section 23 then reflects this log in the shared memory space 12 in each node 100.

In this case, to "count up" means to read out, for example, the transaction data 17 and increment the appearance frequency of an item contained in the data. Hence, the "count up log" indicates the address of an area for recording the appearance frequency of an item. Since this area for recording the appearance frequency of an item is ensured in the shared memory space 12, the processes 11 in all the nodes 100 can access the area with the same address. Therefore, upon reception of the address of an area for recording the appearance frequency of an item as the count up log 20, the node 100 can reflects the count up data, obtained by another node 100, in itself by incrementing the value in the area indicated by the address. This can maintain the consistency of the data in the shared memory space 12 that can be commonly seen among the nodes 100.

Figure 2:
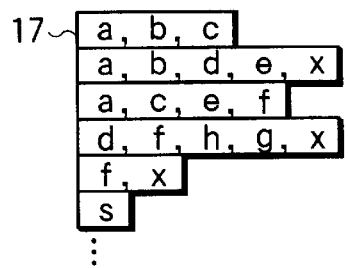
FIG. 2 is a view showing an example of transaction data in this embodiment.

FIG. 2 shows an example of the transaction data 17. Referring to FIG. 2, the first transaction data 17 includes three items a, b, and c, and the second transaction data 17 includes five items a, b, d, e, and x. These items a and b correspond to a paper diaper, a can of beer, and the like in terms of POS data on a supermarket.

Figure 3:
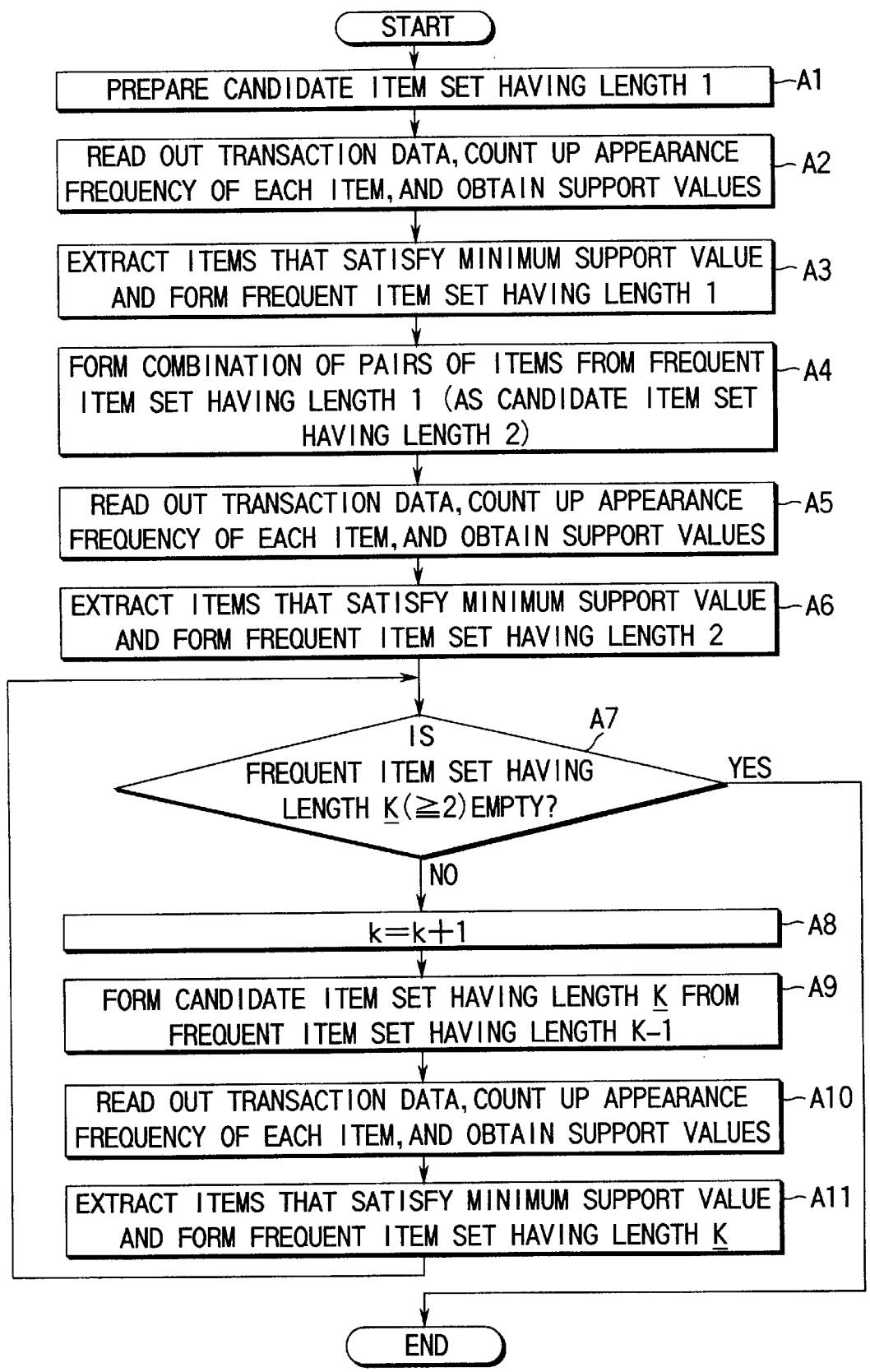
FIG. 3 is a flow chart showing the flow of processing for a program for executing Apriori algorithm that is a technique of efficiently extracting a frequent item set in this embodiment.

FIG. 3 is a flow chart showing the flow of processing for the program executed by Apriori algorithm as a technique of efficiently extracting frequent item sets.

First of all, a candidate item set having length 1 is formed (step A1). In this case, an item set having length 1 is an item set composed of one element such as {a} or {b}. The transaction data 17 is then read out, and the appearance frequency of each item is counted up to obtain support values (step A2). Items that satisfy the minimum support value are extracted to form a frequent item set having length 1 (step A3).

A combination of two items is formed from the frequent item set of length 1 (step A4). This combination is used as a candidate item set having length 2. More specifically, an item set having length 2 is an item set composed of two elements such as {a, b} or {a, c}. The transaction data 17 is then read out, and the appearance frequency of each item is counted up to obtain support values (step A5). Items that satisfy the minimum support value are then extracted to form a frequent item set having length 2 (step A6).

It is checked whether a frequent item set having a length k ($\geq 2$) is empty (step A7). If this item set is empty (YES in step A7), the processing is terminated. If this item is not empty (NO in step A7), k is incremented by one (step A8), and a candidate item set having the length k is formed from a frequent item set having a length k−1 (step A9). The transaction data 17 is the read out, and the appearance frequency of each item is counted up to obtain support values (step A10). Items that satisfy the minimum support value are extracted to form a frequent item set having the length k (step A11). Thereafter, the above processing is repeated from step A7.

Figure 4:
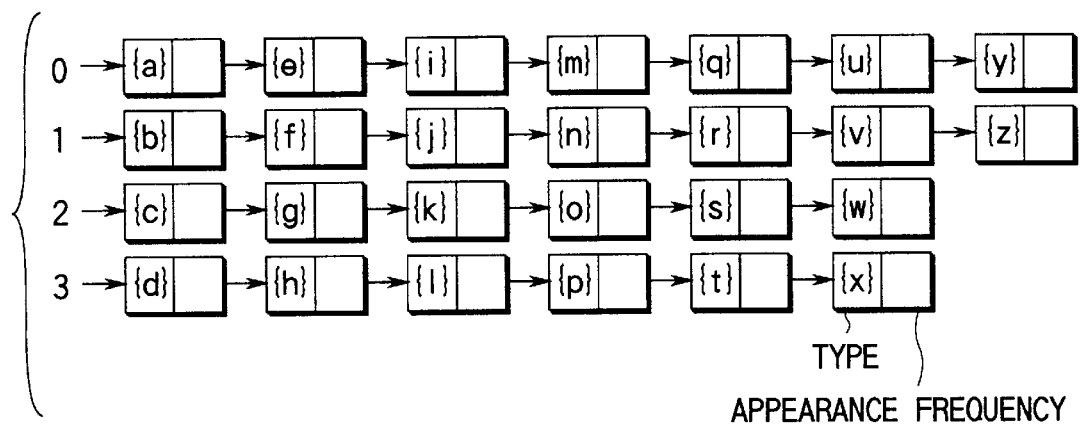
FIG. 4 is a view showing a hash table for managing statistical information composed of the type and appearance frequency of an item having path 1, i.e., length 1, which is counted up in the frequent item set extraction processing in FIG. 3.

FIG. 4 shows the hash table 16 for managing the statistical information 15 consisting of the types and appearance frequencies of items of path 1, i.e., length 1, that are counted up in the frequent item set extraction processing in FIG. 3. In FIG. 4, "{a}", "{b}", and "{c}" indicate the types of items, and the blanks following them indicate areas for counting up the appearance frequencies of the items.

Figure 5:
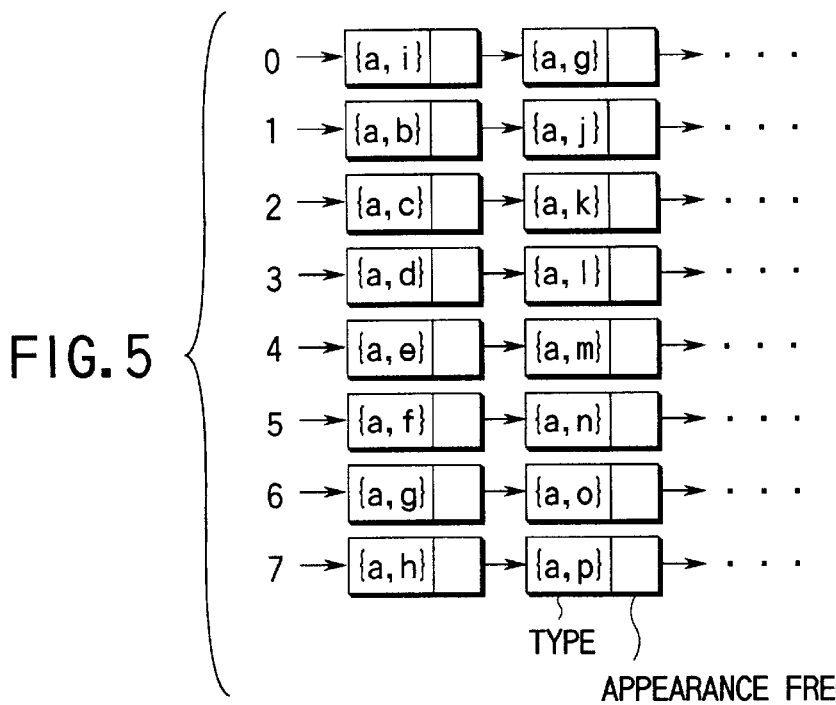
FIG. 5 is a view showing a hash table for managing statistical information composed of the type and appearance frequency of an item having path 2, i.e., length 2, which is counted up in the frequent item set extraction processing in FIG. 3.

FIG. 5 shows the hash table 16 for managing the statistical information 15 consisting of the types and appearance frequencies of items of path 2, i.e., length 2, that are counted up in the frequent item set extraction processing in FIG. 3. In FIG. 5, "{a, b}", "{a, c}", and "{a, d}" indicate the types of items each consisting of two elements, and the blanks following them indicate areas for counting up the appearance frequencies of the items.

Figure 6:
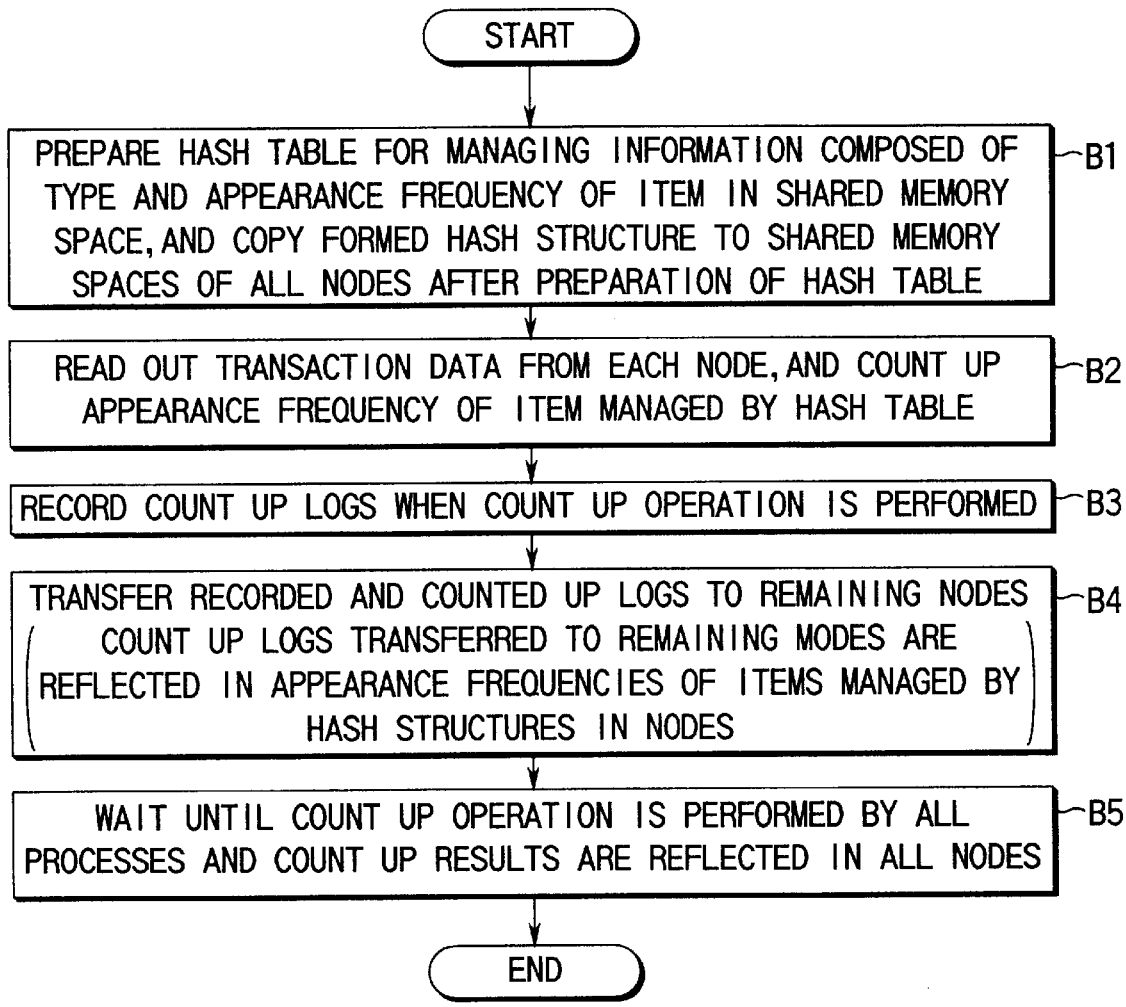
FIG. 6 is a flow chart showing the flow of parallel processing for count up operation performed by a plurality of nodes 100 in the distributed shared memory system according to this embodiment.
Figure 11A:
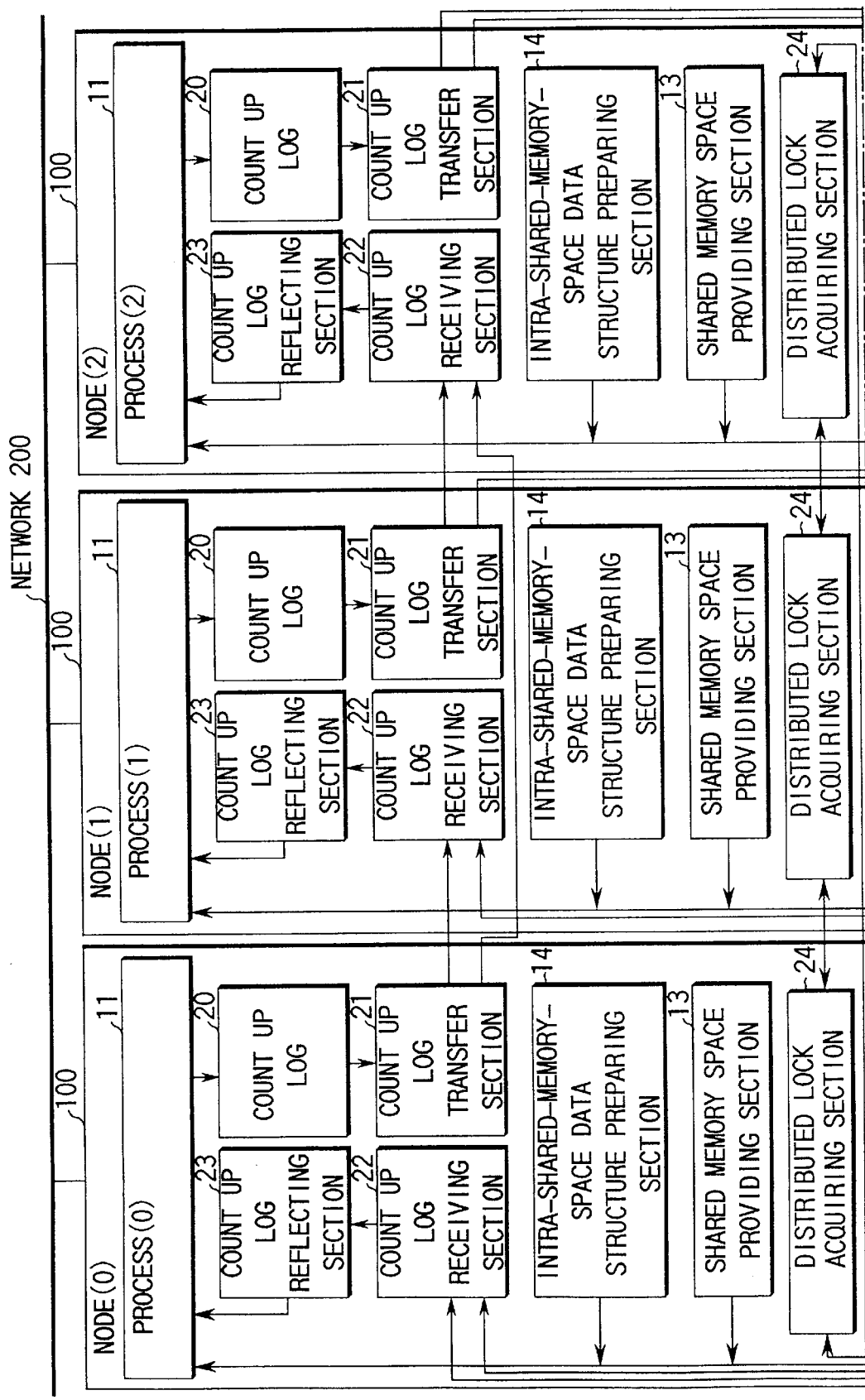
FIGS. 11A and 11B illustrate a block diagram showing the schematic arrangement of a multiprocessor system of a distributed memory type according to another embodiment of the present invention and the functional blocks of a distributed shared memory system applied to this multiprocessor system.
Figure 11B:
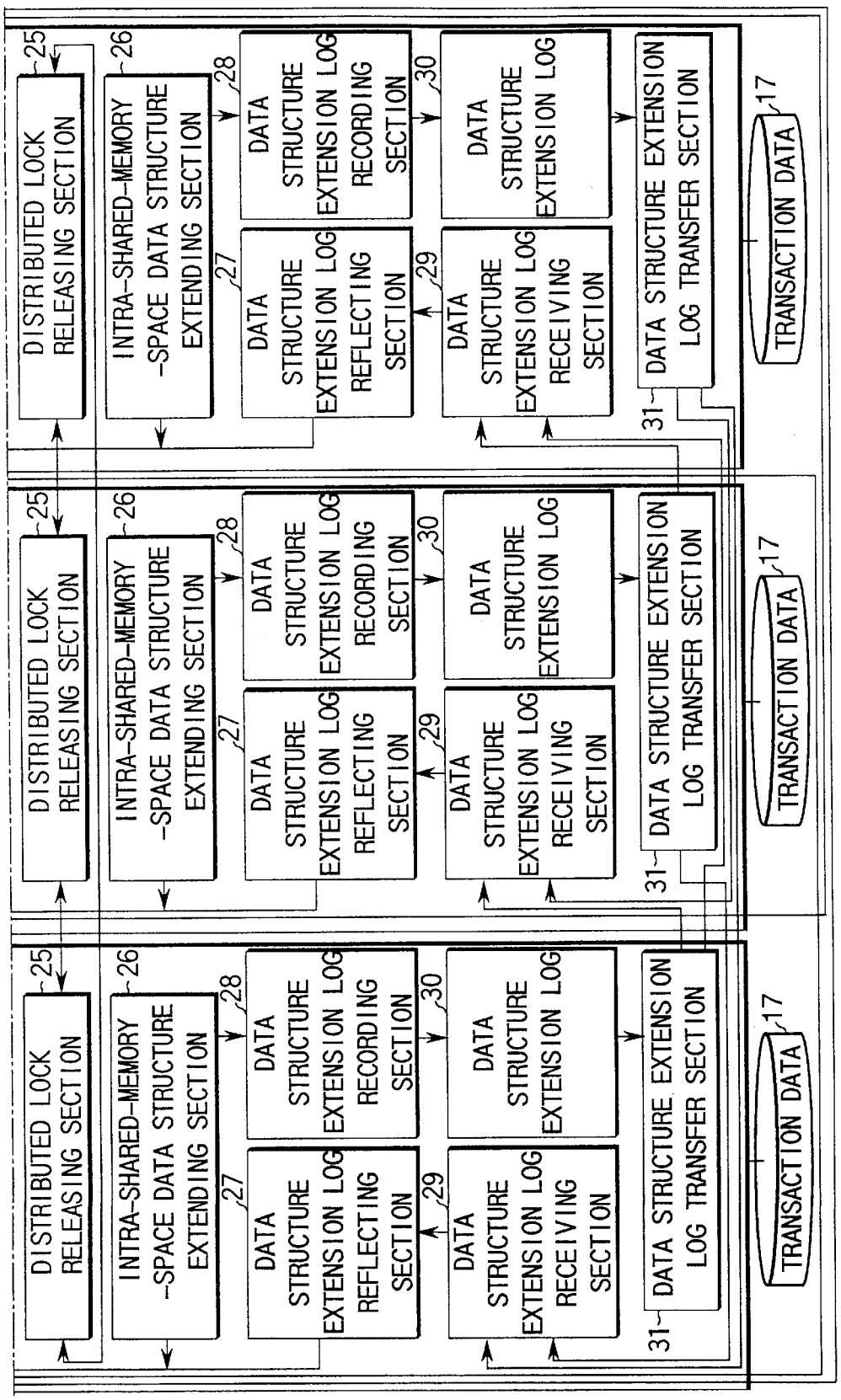

In the distributed shared memory system according to this embodiment, of the flow of processing for the program executing Apriori algorithm shown in FIG. 3, steps A1 and A2, steps A4 and A5, and steps A9 and A10 can be concurrently executed in the nodes 100. FIG. 6 is a flow chart showing the flow of parallel count up processing in the nodes 100 in the distributed shared memory system of this embodiment. More specifically, steps A1 and A2, steps A4 and A5, and steps A9 and A10 in FIG. 3 are performed in accordance with the flow chart of FIG. 6.

First of all, one process 11 that operates in any one of the nodes 100 causes the intra-shared-memory-space data structure preparing section 14 to prepare the hash table 16 for managing the statistical information 15 composed of the type and appearance frequency of an item in the shared memory space 12, and copies the hash table 16 into the shared memory spaces 12 of all the remaining nodes 100 (step B1). Meanwhile, the remaining processes 11 wait the end of this process. With this operation, at the end of step B1, all the processes 11 can refer to the identical hash tables 16 in the shared memory spaces 12 of the processes 11 in all the nodes 100.

Each process 11 then reads out the transaction data 17 in each node 100, and causes the item appearance frequency count up section 18 to count up the appearance frequency of the item managed by the hash table 16 (step B2). In this count up operation, the count up log recording section 19 records a count up log (step B3).

The count up log transfer section 21 transfers this recorded count up log to the remaining nodes (step B4). The count up log transferred to each of the remaining nodes 100 is received by the count up log receiving section 22, and the count up log reflecting section 23 reflects the log in the appearance frequency of the item managed by the hash table 16.

As indicated by step B2, each process 11 of each node 100 independently reads out the transaction data 17 in each node 100, and performs count up operation. As indicated by step B3, however, the count up operation performed in a given node 100 is reflected in the hash tables 16 of all the nodes 100 by transferring the count up log to the remaining nodes. After step B4, therefore, the flow waits until count up operation of each process 11 and reflection of the count up result in the remaining nodes 100 are complete (step B5).

FIG. 7 shows the structure of the count up log 20, on which the address of an area for counting the appearance frequency of an item counted up is recorded every time count up operation is performed. Referring to FIG. 7, "X" indicates the hexadecimal notation. The consistency of the shared memory spaces 12 of the respective nodes 100 can be maintained by transferring this count up log 20 to the remaining nodes 100 and reflecting the log in the respective nodes 100. Note that the count up log in each node is transferred at the timing when the count up log buffer becomes full. Since an area for counting this appearance frequency is located on the shared memory space 12, this area has the identical address in each node 100. Such address information therefore suffices for the count up log 20.

FIG. 8 shows the structure of the transaction data 17 that is used to obtain association rules by handling quantity data as well. The first data includes three "a"s, one "b", and two "c"s, which indicate, for example, three packs of milks, one loaf of bread, and two packs of eggs in terms of POS data.

FIG. 9 shows the structure of the count up log 20 that is used to obtain association rules by handling quantity data as well. In this log, the addresses of areas for counting the appearance frequencies of items counted up are recorded, together with quantity data.

According to the distributed shared memory system of this embodiment, even a multiprocessor system of a distributed memory type without any physical shared memory can efficiently execute large-scale data mining, in which data on the TB order is processed.

The above processing based on Apriori algorithm is not based on the assumption that a data structure for counting appearance frequencies changes in the process of count up operation. The first embodiment described above has not means for effecting an extension of a data structure for counting appearance frequencies in the process of count up operation.

It is, however, conceivable that the operator who has set eight items a, b, c, d, e, f, g, and h as count up targets wants to add a new item j as a count up target while holding the count up results on these items. In this case, for example, as shown in FIG. 10B, a data structure needs an extension. Each of the data structures shown in FIGS. 10A and 10B has a hash structure (hash link). As shown in FIG. 10A, there are only eight entries a, b, c, d, e, f, g, and h before the extension. After the extension, as shown in FIG. 10B, the entry j is added to these entries, and hence a total of nine entries are set. After the extension, therefore, one of the nine entries including the entry i as a new entry is counted up, unlike a case before the extension, in which one of the eight entries a, b, c, d, e, f, g, and h is counted up.

The second embodiment which can effect an extension of a hash table 16 in the process of count up operation will be described below with reference to FIGS. 11A through 16. The same reference numerals in FIGS. 11A and 11B denote the same as those in FIGS. 1A and 1B, and a description thereof will be omitted. As in the arrangement shown in FIGS. 1A and 1B, each process 11 includes a shared memory space 12, a hash table 16, statistical information 15, an item appearance frequency count up section 18, and a count up log recording section 19.

The distributed shared memory system of this embodiment also includes a distributed lock obtaining section 24, a distributed lock releasing section 25, a intra-shared-memory-space data structure extending section 26, a data structure extension log reflecting section 27, a data structure extension log recording section 28, a data structure extension log receiving section 29, and a data structure extension log transfer section 31. This arrangement allows an extension of the hash table 16 in the process of count up operation. An extension of the hash table 16 in the process of count up operation will be described below.

When an extension of the hash table 16 is to be effected in each node 100 while the process 11 is performing count up operation, the distributed lock acquiring section 24 acquires a lock associated with the extension of the hash table 16 to perform exclusive control on data structure extending operation.

The intra-shared-memory-space data structure extending section 26 then extends the hash table 16 in the shared memory space 12. In this case, the data structure extension log recording section 28 records a data structure extension log 30.

When the lock is released by the distributed lock releasing section 25, the recorded data structure extension log 30 is transferred to the remaining nodes 100 by the data structure extension log transfer section 31.

The transferred data structure extension log 30 is received by the data structure extension log receiving section 29 in each node 100, and is reflected in the hash table 16 of the self-node 100 by the data structure extension log reflecting section 27.

Figure 12:
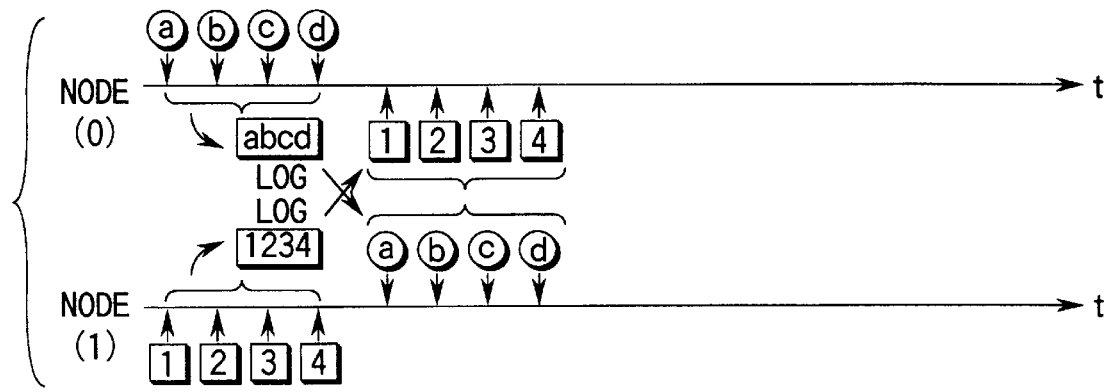
FIG. 12 is a view how the distributed shared memory system performs parallel count up operation between nodes (0) and (1)

FIG. 12 shows how nodes (0) and (1) in the distributed shared memory system in FIGS. 1A and 1B concurrently perform count up operation. For the sake of descriptive convenience, in this case, each buffer for recording logs can store only four logs at maximum. In practice, however, the size of each buffer is set to store several thousand logs or more.

In node (0), a, b, c, and d are counted up, and the resultant data is stored in the buffer. When the buffer becomes full, the data is transferred to node (1) and is also reflected in node (1). Likewise, in node (1), 1, 2, 3, and 4 are counted up, and the resultant data is stored in the buffer. When the buffer becomes full, the data is transferred to node (0), and is also reflected in node (0). This is a case wherein no extension of the data stricture, i.e., the hash table 16, is effected.

Figure 13:
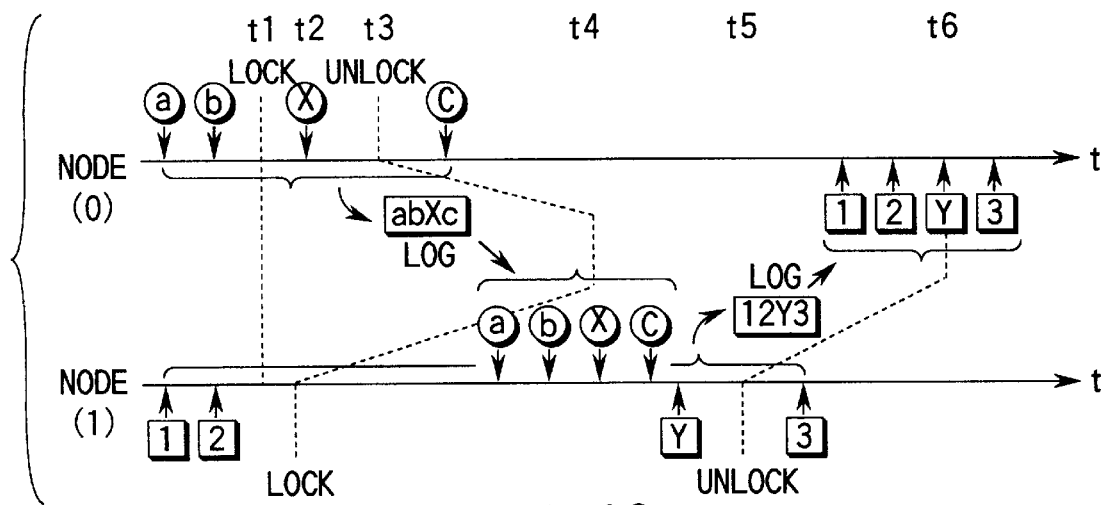
FIG. 13 is a view how the distributed shared memory system of this embodiment performs parallel count up operation between nodes (0) and (1)

FIG. 13 shows how nodes (0) and (1) in the distributed shared memory system of this embodiment concurrently perform count up operation.

In node (0), a lock is acquired to extend the data structure, i.e., the hash table 16, at time t1, and the lock is released at time t3.

A data structure extension log x indicating the extension of the hash table 16 is stored in the buffer, together with the count up logs a, k, and c (a, b, x, c). These data are transferred to node (1) and reflected therein.

In node (1) as well, a lock acquisition request is output at time t2. Since the lock has already been acquired by node (0) at this time point, the lock cannot be immediately obtained, and node (1) is kept waited until time t4.

At time t4, the lock acquired by node (0) is released and hence can be acquired by node (1). Subsequently, the hash table 16 is extended, and the lock is released at time t5. A data structure extension log Y obtained at this time is stored (1, 2, Y, 3) in the buffer together with count up logs 1, 2, and 3. These data are transferred to node (0) and reflected therein.

At time t6, the lock that has been acquired by node (1) is released.

As described above, the distributed shared memory system of this embodiment has the mechanism of performing exclusive control among the nodes 100 and hence can extend the hash table 16 during count up operation.

Figure 14:
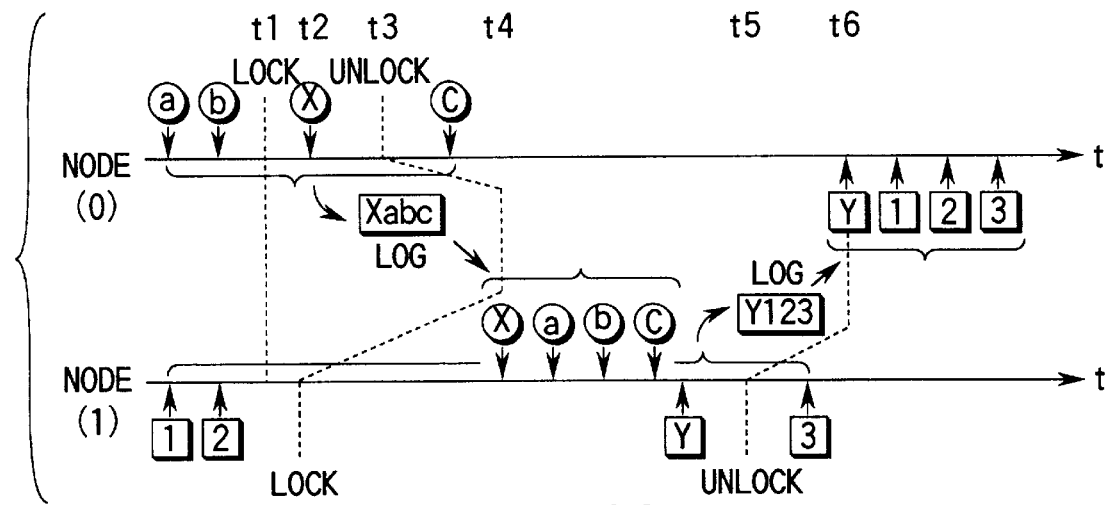
FIG. 14 is a view showing an example of how the method shown in FIG. 13 is modified such that the count up logs and data structure extension log stored in a buffer are rearranged before they are transferred to the remaining nodes such that the data structure extension log comes before the count up logs in the buffer.

FIG. 14 shows a modification of the method in FIG. 13. In this modification, before the count up logs and data structure extension log stored in the buffer are transferred to another node, the logs in the buffer are rearranged such that the data structure extension log comes before the count up logs.

In this case, the number of logs stored in the buffer is small (4). In practice, however, many logs are stored. Since the data structure extension log is located first, a node that receives this log can perform an extension of the data structure first. For this reason, the lock can be released before all the logs in the buffer are reflected in the node.

Figure 15:
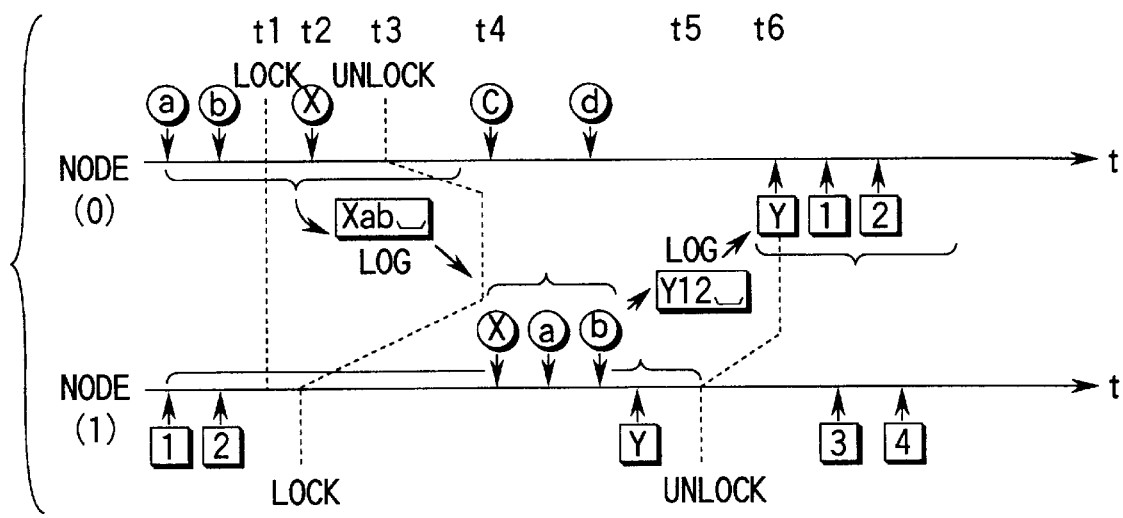
FIG. 15 is a view showing how the method in FIG. 14 is modified such that when a data structure extension log is stored in a buffer, the data structure extension log and count up logs stored in the buffer are immediately transferred to the remaining modes even if the buffer is not full.

FIG. 15 shows another modification of the method shown in FIG. 14. In this modification, a data structure extension log and count up logs are transferred from a given node to another node 100 immediately after the data structure extension log is stored in the buffer even if the buffer is not full.

Figure 16:
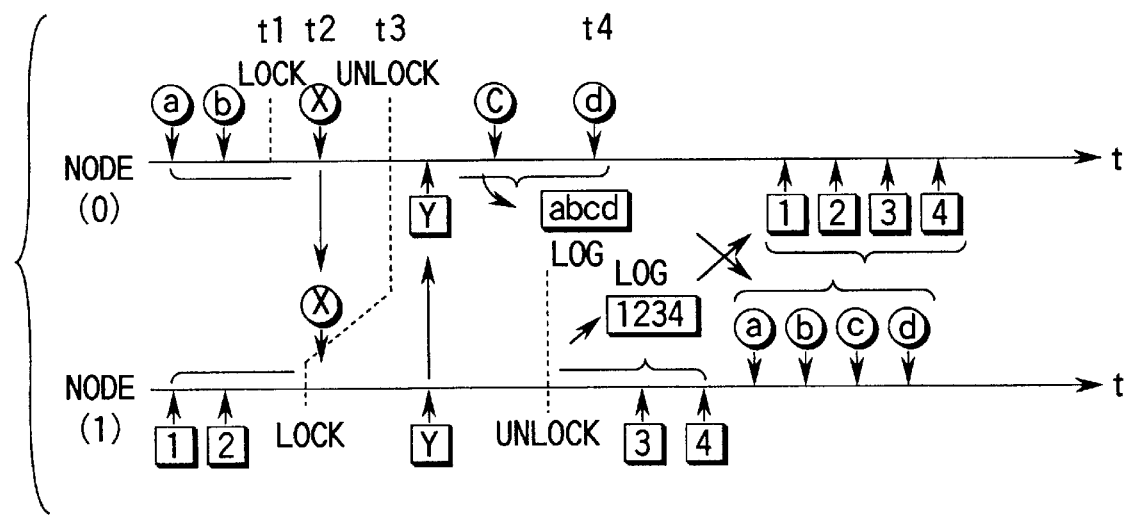
FIG. 16 is a view showing a case wherein count up logs and a data structure extension log are stored in different buffers, and the data structure extension log is transferred to the remaining nodes, prior to the count up logs, to be reflected therein when a lock is released.

FIG. 16 shows still another method.

In this case, count up logs and a data structure extension log are stored in different buffers, and the data structure extension log is sent to another node before the count up logs and is reflected therein when the lock is released. More specifically, in node (0), first of all, a and b are counted up, and a lock is acquired at time t1 to effect an extension of the data structure. At time t3, the lock is released. In this case, only a data structure extension log x is transferred from node (0) to node (1) and is also reflected in node (1).

Subsequently, in node (0), c and d are further counted up. In this case, since the buffer becomes full, the count up logs are transferred from node (0) to node (1) and reflected in node (1).

In node (1), a lock acquisition request is output at time t2. Since node (0) has acquired the lock at this time point, node (1) is kept waited until time t3, at which node (0) releases the lock, and node (1) can acquire the lock.

In node (1), the data structure is extended, and the lock is released at time t4. In this time, a data structure extension log Y is transferred from node (1) to node (0) and reflected in node (0).

After this, 3 and 4 are further counted up in node (1). Since the buffer becomes full at this time, the count up logs are transferred from node (1) to node (0) and also reflected in node (0).

In the cases shown in FIGS. 14 through 16, the execution order of "count up" and "data structure extension" in a given node is changed in another node to improve the execution efficiency.

In addition, since the execution order is only changed such that "data structure extension" is performed before "count up", no contradiction arises in the processing.

In the above embodiment, the appearance frequency of each data item is counted on the basis of Apriori Algorithm. However, the present invention is not limited to this.

The present invention can be generally applied to processing in which a commutative law (a+b=b+a) can be established, e.g., totalization processing.

Furthermore, the data structure held on each distributed shared memory is not limited to a hash table. The present invention can be widely applied to a matrix, a queue, a network, and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A distributed shared memory system applied to a multiprocessor system of a distributed memory type in which a plurality of computers are loosely-coupled, comprising:

shared memory space providing means for providing a shared memory space which is commonly accessible with an identical address with respect to all the processes operating on said plurality of computers;

data structure preparing means for preparing, in the shared memory space, a data structure storing appearance frequency in units of sets of specific items extracted from input data by the processes;

count up history obtaining means for obtaining a history of count up of the process with respect to the appearance frequency stored in the data structure;

count up history transfer means for transferring, to other computers, the count up history obtained by said count up history transfer means;

count up history receiving means for receiving the count up history transferred from each of other computers; and count up history reflecting means for reflecting the count up history received by said count up history receiving means in the appearance frequency stored in the data structure.

2. A system according to claim 1, wherein said count up history obtaining means obtains an address on the data structure at which the counted up appearance frequency is stored.

3. A system according to claim 1, wherein said count up history obtaining means obtains an address on the data structure at which the counted up appearance frequency is stored, together with corresponding quantity data.

4. A system according to claim 1, wherein said data structure preparing means prepares the data structure in one of said plurality of computers, and copies the prepared data structure to said remaining computers.

5. A system according to claim 1, wherein said data structure concurrently preparing means prepares the data structure in said plurality of computers.

6. A distributed shared memory control method applied to a multiprocessor system of a distributed memory type in which a plurality of computers are loosely-coupled, comprising the steps of:

providing a shared memory space which is commonly accessible with an identical address with respect to all the processes operating on said plurality of computers;

preparing, in the shared memory space, a data structure storing appearance frequency in units of sets of specific items extracted from input data by the processes;

obtaining a history of count up of the process with respect to the appearance frequency stored in the data structure;

transferring the obtained count up history to other computers;

receiving the count up history transferred from each of other computers; and reflecting the received count up history in the appearance frequency stored in the data structure.

7. A distributed shared memory system applied to a multiprocessor system of a distributed memory type in which a plurality of computers are loosely-coupled, each of said plurality of computers comprising:

shared memory space providing means for providing, with respect to an identical computer, a shared memory space which is accessible, with an address identical to that of the process operating on other computers;

data structure preparing means for preparing, in the shared memory space, a data structure storing appearance frequency in units of sets of specific items extracted by the process operating on said identical computer;

count up history obtaining means for obtaining a history of count up of the processes operating on said identical computer with respect to the appearance frequency stored in the data structure;

count up history transfer means for transferring, to said other computers, the count up history obtained by said count up history transfer means;

count up history receiving means for receiving the count up history transferred from said other computers;

count up history reflecting means for reflecting the count up history received by said count up history receiving means in the appearance frequency stored in the data structure;

data structure extension means for effecting an extension of the data structure;

extension history obtaining means for obtaining a history of the extension of the executed data structure;

extension history transfer means for transferring the extension history received by said extension history obtained by said extension history obtaining means to said other computers;

extension history receiving means for receiving the extension history transferred from each of said other computers;

extension history reflecting means for reflecting the extension history received by said extension history receiving means in the data structure; and extension exclusive control means for exclusively controlling an extension of the data structure between said data structure extension means and extension history reflecting means which operate on said identical computer and said data structure extension means and extension history reflecting means which operate on each of said other computers.

8. A system according to claim 1, wherein each of said plurality of computers further comprises collective history transfer means for temporarily storing the extension history transferred by said extension history transfer means and the count up history transferred by said history transfer means in a buffer, and collectively transferring the histories to said other computers.

9. A system according to claim 8, wherein said collective history transfer means comprises means for rearranging the stored extension history and count up history such that the extension history is transferred before the count up history.

10. A system according to claim 8, wherein said collective history transfer means collectively transfers the extension history and the count up history to said other computers when the extension history is stored in said buffer.

11. A system according to claim 8, further comprising:

a first buffer for temporarily storing the extension history;

a second buffer for temporarily storing the count up history; and means for reflecting the extension history in said other computers as destinations prior to the count up history when the exclusive control is released.

12. A system according to claim 7, wherein arbitrary operation in which a commutative law (a+b=b+a) is established is performed for data stored in the data structure.

13. A system according to claim 7, wherein the data structure can be constructed in an arbitrary form.

14. A distributed shared memory control method applied to a distributed shared memory system applied to a multiprocessor system of a distributed memory type in which a plurality of computers are loosely-coupled, each of said plurality of computers comprising shared memory space providing means for providing, with respect to an identical computer, a shared memory space which is accessible, with an address identical to that of the process operating on said other computers, data structure preparing means for preparing, in the shared memory space, a data structure storing appearance frequency in units of sets of specific item extracted by the process operating on said identical computer, count up history obtaining means for obtaining a history of count up of the processes operating on said identical computer with respect to the appearance frequency stored in the data structure, count up history transfer means for transferring, to said other computers, the count up history obtained by said count up history transfer means, count up history receiving means for receiving count up history transferred from each of said other computers, and count up history reflecting means for reflecting the count up history received by said count up history receiving means in the appearance frequency stored in the data structure, the computer readable program code means in said article of manufacture, comprising the steps of:

effecting an extension of the data structure with respect to said other computers exclusively;

obtaining a history of the extension of the executed data structure;

transferring the obtained extension history to said other computers;

receiving the extension history transferred from each of said other computers; and reflecting the received extension history in the data structure while keeping consistency with said other computers.

15. A method according to claim 14, further comprising the step of temporarily storing the extension history and count up history to be transferred, and collectively transferring the histories to said other computers.

16. A method according to claim 15, further comprising the step of rearranging the stored extension history and count up history such that the extension history is transferred before the count up history.

17. A method according to claim 15, wherein the step of collectively transferring the extension history and the count up history comprises collectively transferring the extension history and the count up history to said other computers when the extension history is stored in said buffer.

18. A method according to claim 15, further comprising the step of transferring the extension history before the count up history when the exclusive control is released.

19. A method according to claim 14, wherein said distributed shared memory system performs arbitrary operation in which a commutative law (a+b=b+a) is established for data stored in the data structure.

20. A method according to claim 14, wherein the data structure can be constructed in an arbitrary form.

* * * * *